(12) United States Patent
Nakamura et al.

(10) Patent No.: US 8,304,058 B2
(45) Date of Patent: Nov. 6, 2012

(54) GLASS FILM LAMINATE, GLASS ROLL OF THE LAMINATE, METHOD OF PROTECTING END FACE OF GLASS FILM, AND METHOD OF PRODUCING GLASS ROLL

(75) Inventors: Takahide Nakamura, Otsu (JP); Koichi Mori, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 276 days.

(21) Appl. No.: 12/710,631

(22) Filed: Feb. 23, 2010

(65) Prior Publication Data

US 2010/0260964 A1 Oct. 14, 2010

(30) Foreign Application Priority Data

Mar. 26, 2009 (JP) .................................. 2009-075986

(51) Int. Cl.
*B32B 17/06* (2006.01)
*B32B 7/10* (2006.01)
(52) U.S. Cl. ..................................... 428/189; 242/160.4
(58) Field of Classification Search .................... 428/76, 428/78, 77, 68, 189; 156/306.3; 242/160.4, 242/520
See application file for complete search history.

(56) References Cited

U.S. PATENT DOCUMENTS

| 5,033,615 A * | 7/1991 | Shima et al. ................... 206/714 |
| 2010/0276066 A1 | 11/2010 | Kondo |

FOREIGN PATENT DOCUMENTS

| EP | 2 236 281 | 10/2010 |
| JP | 10-095636 | 4/1998 |
| JP | 2001-097733 | 4/2001 |
| JP | 2001-113631 | 4/2001 |
| JP | 2003-039597 | 2/2003 |
| JP | 2007-010834 | 1/2007 |
| JP | 2007-331996 | 12/2007 |
| JP | 2008-133174 | 6/2008 |
| WO | 2009/093505 | 7/2009 |

OTHER PUBLICATIONS

International Preliminary Report on Patentability and Written Opinion of the International Searching Authority issued Oct. 27, 2011 in corresponding International (PCT) Application No. PCT/JP2010/052745.

International Search Report issued May 25, 2010 in corresponding International (PCT) Application No. PCT/JP2010/052745.

* cited by examiner

*Primary Examiner* — Alexander Thomas

(74) *Attorney, Agent, or Firm* — Wenderoth, Lind & Ponack, L.L.P.

(57) ABSTRACT

A glass film laminate has a glass film, a support sheet laminated on one surface of the glass film to extend off the glass film, and a protective sheet peelably laminated on the other surface of the glass film to cover the edges of the glass film. A glass roll is produced by winding the laminate.

11 Claims, 5 Drawing Sheets

GLASS FILM LAMINATE, GLASS ROLL OF THE LAMINATE, METHOD OF PROTECTING END FACE OF GLASS FILM, AND METHOD OF PRODUCING GLASS ROLL

TECHNICAL FIELD

The present invention relates to a glass film laminate in which a glass substrate for a device such as a glass substrate used in a flat panel display, for example, a liquid crystal display or an OLED display, or a glass substrate for a solar cell and a glass film used in, for example, a cover glass for an OLED lighting are supported by a support sheet, a glass roll of the laminate, a method of protecting an end face of a glass film, and a method of producing a glass roll.

BACKGROUND ART

From the viewpoint of space savings, flat panel displays such as liquid crystal displays, plasma displays, OLED displays, and field emission displays have recently become widespread instead of CRT displays that have been conventionally widespread. An additional thinning has been required for each of those flat panel displays. In particular, the OLED displays have been required not only to be easily portable by being folded or rolled but also to be usable in curved surfaces as well as flat surfaces. In addition, those requisitions to be usable in curved surfaces as well as flat surfaces are not limited to the displays. If solar cells or OLED lightings can be formed on the surfaces of substances each having a curved surface such as the surfaces of the bodies of automobiles, and the roofs, poles, and external walls of architectural structures, the solar cells or the OLED lightings will find use in an expanded variety of applications. Therefore, an additional thinning and high flexibility have been required for each of substrates and cover glasses used in those devices.

Luminescent materials used in the OLED displays deteriorate by contact with a gas such as oxygen. Therefore, a high gas barrier characteristic is required for a substrate used in the OLED displays, and hence the use of a glass substrate has been expected. However, glass used in the substrate is brittle to a tensile stress unlike a resin film, and hence has low flexibility. The concentration of a tensile strength to the surface of the glass substrate by the bending of the glass substrate leads to the breakage of the substrate. An ultra-thinning needs to be performed for imparting flexibility to the glass substrate, and such a glass film having a thickness of 200 μm or less as described in Patent Document 1 below has been proposed.

A glass substrate used in electronic devices such as a flat panel display or a solar cell is subjected to various treatments related to the production of the electronic devices such as a coating treatment with a transparent conductive film or the like, and a cleaning treatment. However, when the glass substrate used in those electronic devices is turned into a film, some degree of a change in stress leads to the breakage of the film because glass is a brittle material. Accordingly, there arises such a problem that it is remarkably difficult to handle the film upon performance of the above various treatments related to the production of the electronic devices.

In view of the foregoing, such a laminate of a glass sheet and a resin layer as described in Patent Document 2 has been proposed for improving the handleability of a glass film. Patent Document 2 describes a laminate obtained by providing the resin layer with an adhesive layer formed of an adhesive and the like, and then laminating a glass film. In such laminate, the glass film is supported by the resin film as a tough material, and hence the handling of the glass film laminate upon performance of the above various production-related treatments becomes easier than that in the case of the glass film alone.

However, upon handling of the laminate described in Patent Document 2, such a problem that a crack generates from an edge of the glass film and hence breaking, chipping, or the like occurs arises. An unnecessary portion generated during the forming of the glass film is cut and removed, and hence a fine flaw upon cut and removal of the unnecessary portion remains at the edge of the glass film. When a stress is concentrated to the edge of the glass film upon handling of the glass film, breaking, chipping, or the like occurs due to the fine flaw as an origin. The breaking, chipping, or the like cannot be prevented merely by laminating the resin layer on one surface of the glass film as described in Patent Document 2.

Citation List
  Patent Document 1: JP-A-2008-133174
  Patent Document 2: JP-A-2001-97733

SUMMARY OF INVENTION

Technical Problem

The present invention has been made with a view to solving such problems of the prior art as described above, and an object of the present invention is to provide a glass film laminate capable of effectively preventing the occurrence of breaking, chipping, or the like originated from an edge of a glass film and capable of additionally improving handleability when a glass film is subjected to production-related treatments, a glass roll of the laminate, a method of protecting an end face of a glass film, and a method of producing a glass roll.

Solution to Problem

The invention according to a first aspect relates to a glass film laminate having a glass film, a support sheet laminated on one surface of the glass film to extend off the glass film, and a protective sheet peelably laminated on the other surface of the glass film to cover edges of the glass film.

The invention according to a second aspect relates to the glass film laminate according to the first aspect in which the glass film has a thickness of 300 μor less.

The invention according to a third aspect relates to the glass film laminate according to the first or second aspect in which the support sheet has a cohesive strength of 0.002 to 2.00 N/25 mm.

The invention according to a fourth aspect relates to the glass film laminate according to the first to third aspects in which the support sheet has a thickness of 3 to 250 μm.

The invention according to a fifth aspect relates to the glass film laminate according to the first to fourth aspects in which the protective sheet has a thickness of 3 to 250 μm.

The invention according to a sixth aspect relates to the glass film laminate according to the first to fifth aspects in which the protective sheet completely covers a cohesive portion of the support sheet.

The invention according to a seventh aspect relates to the glass film laminate according to the first to sixth aspects in which the protective sheet is substantially identical in size to the support sheet.

The invention according to an eighth aspect relates to a glass roll produced by winding the glass film laminate according to the sixth or seventh aspect.

The invention according to a ninth aspect relates to a method of protecting an end face of a glass film, the method including: laminating a cohesive support sheet on one surface of a glass film so that the support sheet extends off the glass film; and peelably laminating a protective sheet on the other surface of the glass film so that the protective sheet covers edges of the glass film and the support sheet.

The invention according to a tenth aspect relates to a method of producing a glass roll, the method including winding a glass film laminate produced by laminating a cohesive support sheet on one surface of a glass film so that the support sheet extends off the glass film and peelably laminating a protective sheet on the other surface of the glass film so that the protective sheet covers edges of the glass film and a cohesive portion of the support sheet.

ADVANTAGEOUS EFFECTS OF INVENTION

According to the invention of the first aspect, the glass film laminate has the glass film, the support sheet laminated on one surface of the glass film to extend off the glass film, and the protective sheet peelably laminated on the other surface of the glass film to cover the edges of the glass film, and hence the edges of the glass film can be protected by being sandwiched between the support sheet and the protective sheet. As a result, a stress can be prevented from converging on an edge of the glass film, and hence the occurrence of breaking, chipping, or the like in the glass film with a fine flaw or the like remaining on an end face of the glass film as an origin can be effectively prevented. Accordingly, the handleability of the glass film can be improved.

According to the invention of the second aspect, the glass film has a thickness of 300 μm or less, and hence production-related treatments can be easily performed even in an ultrathin glass film which is additionally hard to handle and which is apt to cause a problem such as breaking or chipping.

According to the invention of the third aspect, the support sheet has a cohesive strength of 0.002 to 2.00 N/25 mm, and hence the support sheet is weakly cohesive. Accordingly, the support sheet can be easily peeled from the glass film after the protective sheet has been peeled. As a result, the support sheet can be easily peeled from the glass film laminate after production-related treatments, and hence only the glass film can be easily incorporated into each of various devices and the like.

According to the invention of the fourth aspect, the support sheet has a thickness of 3 to 250 μm, and hence the glass film can be surely supported.

According to the invention of the fifth aspect, the protective sheet has a thickness of 3 to 250 μm, and hence the glass film and the support sheet can be appropriately protected.

According to the invention of the sixth aspect, the protective sheet covers the cohesive portion of the support sheet, and hence the adhesion of dirt or the like to the cohesive portion of the support sheet and the cohesion of the support sheet upon handling of the glass film can be prevented.

According to the invention of the seventh aspect, the protective sheet is substantially identical in size to the support sheet, and hence both the glass film and the cohesive surface of the support sheet can be completely covered with the protective sheet. As a result, the adhesion of dirt or the like to the cohesive portion of the support sheet and the cohesion of the support sheet upon handling of the glass film can be prevented, and hence the handling of the glass film can be additionally facilitated. In addition, the glass film can be protected.

According to the invention of the eighth aspect, the glass roll is produced by winding the glass film laminate according to the sixth or seventh aspect, and hence the winding can be performed while the occurrence of breaking, chipping, or the like in the glass film is prevented even when a glass roll in which a stress is apt to converge particularly on an edge of the glass film is produced. The cohesive surface of the support sheet is covered with the protective sheet. Accordingly, even when the glass roll is produced by winding the glass film laminate, the cohesion of the inner layer and outer layer of the support sheet as a result of their overlapping can be prevented, and hence the cause for deflection during the winding can be resolved. As a result, upon production of the glass roll by the winding of the glass film laminate, deflection can be absorbed, and hence the winding can be facilitated. In addition, even when a displacement occurs, modification can be easily performed.

According to the invention of the ninth aspect, the method of protecting an end face of a glass film is characterized by including: laminating the cohesive support sheet on one surface of the glass film so that the support sheet extends off the glass film; and peelably laminating the protective sheet on the other surface of the glass film so that the protective sheet covers the edges of the glass film. As a result, the end face of the glass film in which breaking, a crack, or the like is particularly apt to occur can be appropriately protected.

According to the invention of the tenth aspect, the method of producing a glass roll is characterized by including winding the glass film laminate produced by laminating the cohesive support sheet on one surface of the glass film so that the support sheet extends off the glass film and by peelably laminating the protective sheet on the other surface of the glass film so that the protective sheet covers the edges of the glass film and the cohesive portion of the support sheet. As a result, a finely wound glass roll in which the glass film is free of breaking and chipping and in which no displacement occurs upon winding can be produced.

DETAILED DESCRIPTION OF THE INVENTION

Hereinafter, preferred embodiments of a glass film laminate and a glass roll of the glass film laminate according to the present invention are described with reference to the drawings.

Figure 1A:
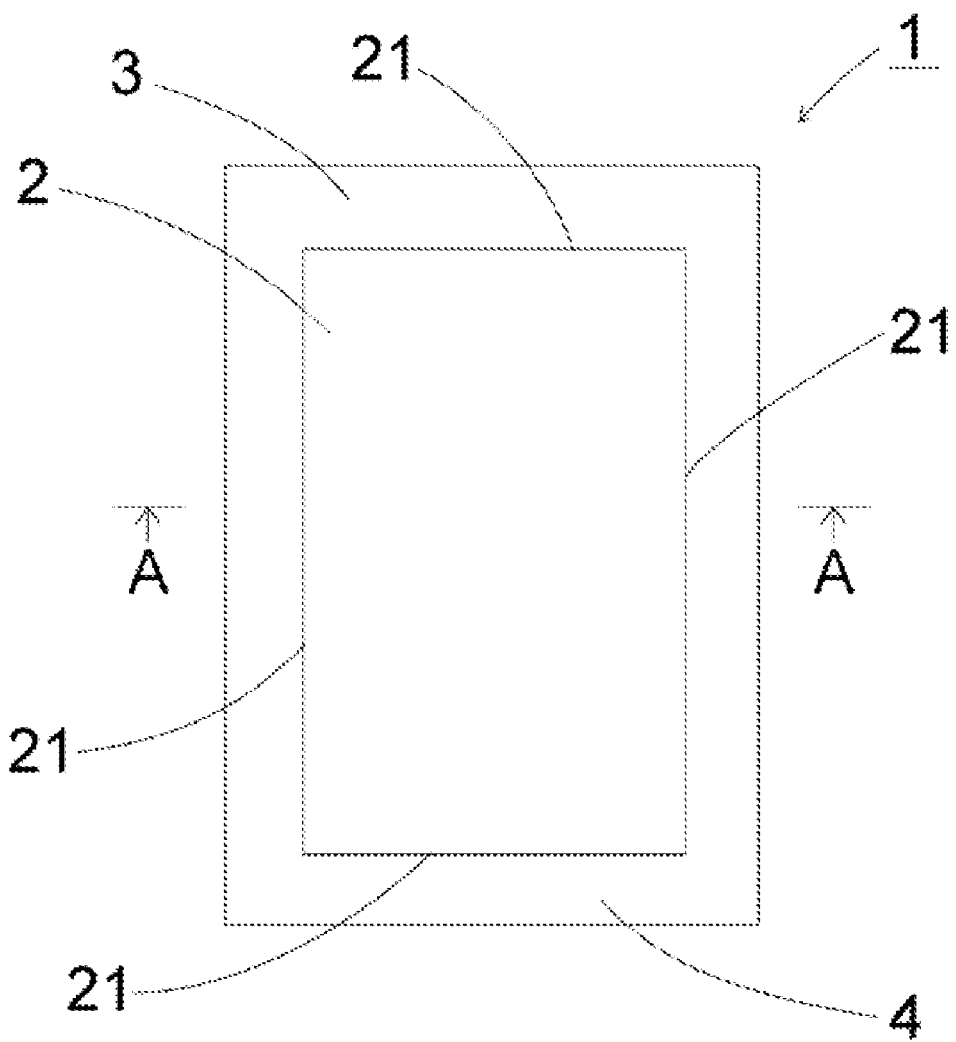
[FIG. 1(a)] A plan view illustrating a glass film laminate according to a first embodiment of the present invention.

As illustrated in each of FIGS. 1a) and 1(b), a glass film laminate (1) according to the present invention has a glass film (2), a support glass (3), and a protective film (4).

A silicate glass, preferably a silica glass or a borosilicate glass, or most preferably a no-alkali borosilicate glass is used in the glass film (2). When the glass film (2) contains an alkali component, the substitution of a cation occurs on its surface. As a result, the so-called soda blasting phenomenon occurs, and hence the film becomes structurally rough. In this case, when the glass film (2) is used while being curved, the film may break from a portion that has become rough owing to age deterioration. It should be noted that the term "no-alkali borosilicate glass" as used herein refers to a glass substantially free of any alkali component, or specifically a glass containing an alkali component at 1000 ppm or less. The content of the alkali component in the present invention is preferably 500 ppm or less, or more preferably 300 ppm or less.

The glass film (2) has a thickness of preferably 300 μm or less, more preferably 5 μm to 200 μm, or most preferably 5 μm to 100 μm. As a result, appropriate flexibility can be imparted to the glass film (2) by additionally reducing the thickness of the film. In addition, production-related treatments can be easily performed even in an ultrathin glass film in which a problem such as breaking or chipping is apt to occur. When the thickness is less than 5 μm, the strength of the glass film (2) is apt to be insufficient, and breakage is apt to occur when the glass film (2) is peeled from the glass film laminate (1) so as to be incorporated into a device.

Figure 2:
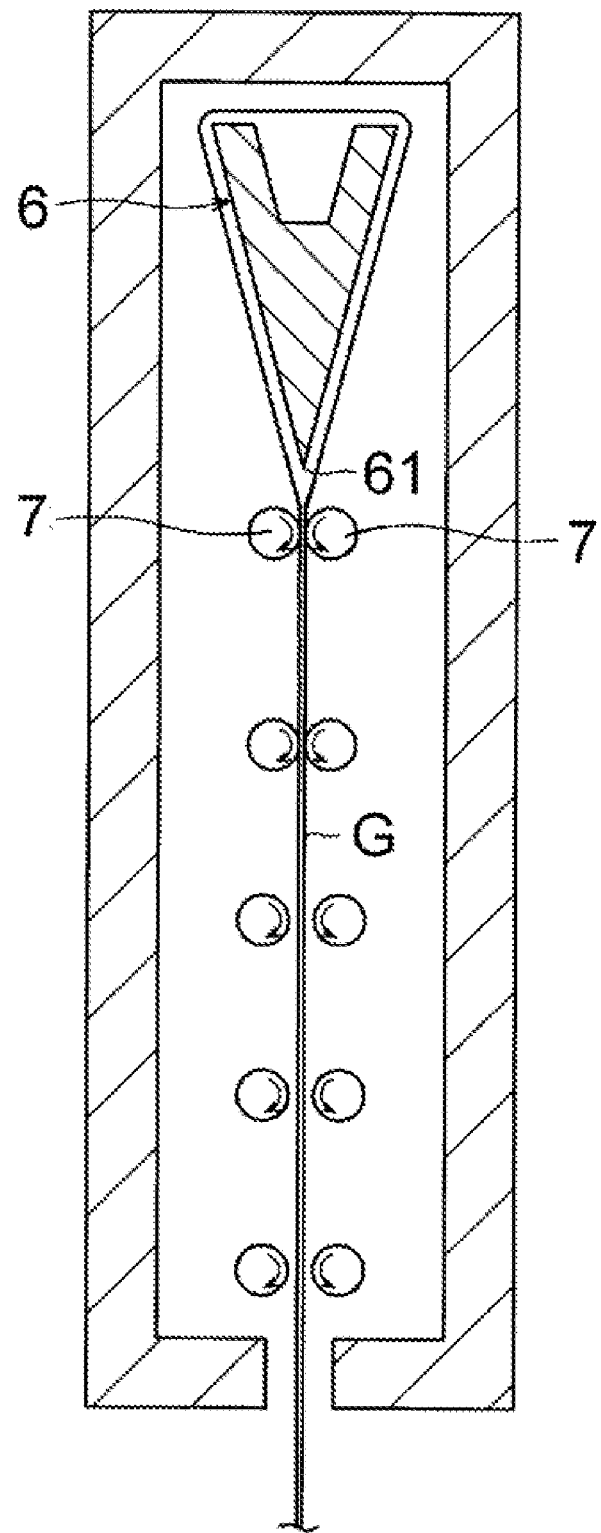
[FIG. 2] An explanatory view illustrating an apparatus for producing a glass film.

As illustrated in FIG. 2, the glass film (2) used in the present invention is preferably formed by an overflow down-draw method. The reason for the foregoing is as described below. The overflow down-draw method is a forming method in which none of both surfaces of a glass plate contacts a forming member during forming, and hence a flaw is hardly generated on each of both surfaces (transmissive surfaces) of the resultant glass plate and high surface quality can be obtained without any polishing.

A glass ribbon (G) immediately after its falling from a lower end portion (61) of a forming trough (6) having a wedge-shaped section is downward to be as thin as a predetermined thickness while contraction in its width direction is regulated by cooling rollers (7). Next, the glass ribbon (G) whose thickness has reached the predetermined thickness is gradually cooled in an annealer so that the thermal strain of the glass ribbon (G) may be eliminated. Then, the glass ribbon (G) is cut into predetermined dimensions. Thus, the glass film (2) is formed.

Figure 1B:
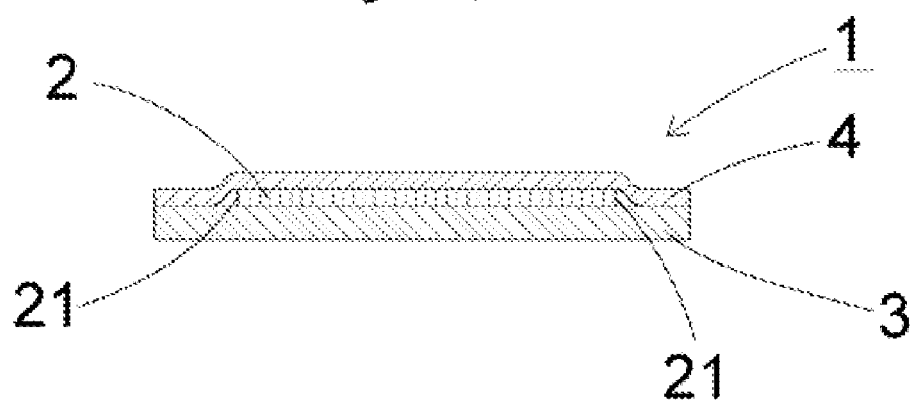
[FIG. 1(b)] A sectional view taken along the line A-A of FIG. 1(a).

As illustrated in each of FIGS. 1(a) and 1(b), the support sheet (3) is laminated so as to extend off the glass film (2). The amount in which the sheet extends off is preferably 0.1 cm to 50 cm or more preferably 0.5 to 10 cm from each of edges (21) of the glass film (2). When the amount is less than 0.1 cm, there is a possibility that the protection of the edges (21) is apt to be insufficient. On the other hand, when the amount exceeds 50 cm, the laminate may become difficult to handle.

For the support sheet (3), a resin having flexibility is preferably used for improving the handleability, and, for example, polyethylene, polyvinyl chloride, polyethylene terephthalate, polyvinylidene chloride, polypropylene, polyvinyl alcohol, polyester, polycarbonate, polystyrene, polyacrylonitrile, an ethylene-vinylacetate copolymer, an ethylene-vinyl alcohol copolymer, an ethylene-methacrylate copolymer, nylon, cellophane, silicone resin, and the like may be used. Of those, polyethylene terephthalate and polyethylene are preferably used. Or, a closed cell foamed resin may be used. That is, the use of a foamed resin in the support sheet (3) imparts high flexibility to the support sheet (3). In addition, the use of the closed cell foamed resin can prevent atmospheric dust from passing through the support sheet (3) to adhere to the glass film (2). When the glass film (2) obtained by peeling the support sheet (3) from the glass film laminate (1) is used in an electronic device or the like, the color of the support sheet (3) to be laminated is not particular limited. The support sheet (3) may be free of being colored so as to be colorless. Alternatively, the support sheet (3) can be colored white, black, blue, green, yellow, or the like so that a judgment as to whether the support sheet (3) is peeled from the glass film laminate (1) can be made. In this case, the translucency of the support sheet (3) is not particularly limited either, and the sheet may be, for example, transparent, semitransparent, or opaque.

The support sheet (3) has a thickness of preferably 3 to 250 μm or more preferably 10 to 100 μm. As a result, the glass film (2) can be surely supported. When the thickness of the support sheet (3) is less than 3 μm, the glass film laminate (1) may become difficult to handle owing to an excessively small thickness of the support sheet (3). In addition, when the thickness of the support sheet (3) exceeds 250 μm, the handling may similarly become difficult owing to an excessively large thickness of the entirety of the glass film laminate (1).

In addition, when the support sheet (3) is finally peeled upon incorporation into a device, conductivity is preferably imparted to the support sheet (3) by incorporating a conductive substance into the sheet or by forming a conductive film on the surface of the sheet. That is, peeling electrification occurring between the glass film (2) and the support sheet (3) upon peeling of the support sheet (3) from the glass film laminate (1) can be prevented, and hence atmospheric dust or the like can be prevented from adhering to the glass film (2) after the peeling owing to a coulomb force or the like.

Cohesiveness may be imparted to the support sheet (3). In this case, the support sheet (3) has a cohesive strength of preferably 0.002 to 2.00 N/25 mm, more preferably 0.002 to 1.00 N/25 mm, or most preferably 0.005 to 0.9 N/25 mm. The reason for the foregoing is as described below. Since the support sheet (3) is weakly cohesive, the support sheet (3) can be easily peeled from the glass film (2) after the peeling of the protective sheet (4). As a result, the support sheet (3) can be easily peeled from the glass film laminate (1) after the production-related treatments, and hence only the glass film (2) can be easily incorporated into each of various devices and the like. When the cohesive strength is less than 0.002 N/25 mm, there is a possibility that the cohesive strength of the support sheet (3) is apt to be insufficient. When the cohesive strength exceeds 2.00 N/25 mm, it may become difficult to peel the protective sheet (4). In addition, in this case, cohesiveness, which is typically imparted to the entire surface of the support sheet (3), does not necessarily need to be imparted to the entire surface of the support sheet (3), and may be imparted only to a surface to be stuck to the glass film (2). Further, cohesiveness may be imparted to the next larger size area than the surface to be stuck to the glass film (2) for facilitating sticking with the protective sheet (4).

The protective sheet (4) is peelably laminated on the other surface of the glass film (2) (surface out of contact with the support sheet (3)) to cover the edges (21) of the glass film (2). As a result, the edges (21) of the glass film can be protected by being sandwiched between the support sheet (3) and the protective sheet (4). A stress can be prevented from converging on each of the edges (21) of the glass film, and hence the occurrence of breaking, chipping, or the like in the glass film (2) with a fine flaw or the like remaining on an end face of the glass film as an origin can be effectively prevented. Accordingly, the handleability of the glass film (2) can be improved.

As the protective sheet (4), a resin having flexibility is preferably used for improving the handleability, and, for example, polyethylene, polyvinyl chloride, polyethylene terephthalate, polyvinylidene chloride, polypropylene, polyvinyl alcohol, polyester, polycarbonate, polystyrene, polyacrylonitrile, an ethylene-vinylacetate copolymer, an ethylene-vinyl alcohol copolymer, an ethylene-methacrylate copolymer, nylon, cellophane, silicone resin, and the like may be used. Of those, polyethylene terephthalate and polyethylene are preferably used. Alternatively, a closed cell foamed resin may be used. That is, the use of a foamed resin in the protective sheet (4) imparts high flexibility to the protective sheet (4). In addition, the use of the closed cell foamed resin can prevent atmospheric dust from passing through the protective sheet (4) to adhere to the glass film (2). The protective sheet (4) is finally peeled and removed, and hence the color of the sheet is not particular limited. The protective sheet (4) may be free of being colored so as to be colorless. Alternatively, the protective sheet (4) can be colored white, black, blue, green, yellow, or the like so that a judgment as to whether the protective sheet (4) is peeled from the glass film laminate (1) can be made. In this case, the translucency of the protective sheet (4) is not particularly limited either, and the sheet may be, for example, transparent, semitransparent, or opaque.

The protective sheet (4) has a thickness of preferably 3 to 250 μm or more preferably 10 to 100 μm. As a result, the glass film (2) and the support sheet (3) can be appropriately protected. When the thickness of the protective sheet (4) is less than 3 μm, the glass film laminate (1) may become difficult to appropriately protect owing to an excessively small thickness of the protective sheet (4). In addition, when the thickness of the protective sheet (4) exceeds 250 μm, the protection may similarly become difficult owing to an excessively large thickness of the entirety of the glass film laminate (1).

The protective sheet (4) preferably covers the cohesive portion of the support sheet (3). As a result, the adhesion of dirt or the like to the cohesive portion of the support sheet (3) and the cohesion of the support sheet (3) upon handling of the glass film (2) can be prevented. When cohesiveness is imparted to the entire surface of the support sheet (3), the protective sheet (4) preferably covers the entire surface of the support sheet (3) extending off the glass film (2). On the other hand, when cohesiveness is imparted to part of the support sheet (3), the protective sheet (4) preferably covers at least the portion to which cohesiveness is imparted.

It is preferred that, as illustrated in each of FIGS. 1(a) and 1(b), the protective sheet (4) be substantially identical in size to the support sheet (3). As a result, the surfaces of the glass film (2) and the support sheet (3) can be completely covered with the protective sheet (4). The adhesion of dirt or the like to the cohesive portion of the support sheet (3) resulting from the exposure of the cohesive portion of the support sheet (3) and the cohesion of the support sheet (3) to any other member upon handling of the glass film (2) can be prevented, and hence the handling of the glass film (2) can be additionally facilitated. In addition, the glass film (2) can be protected.

Figure 3:
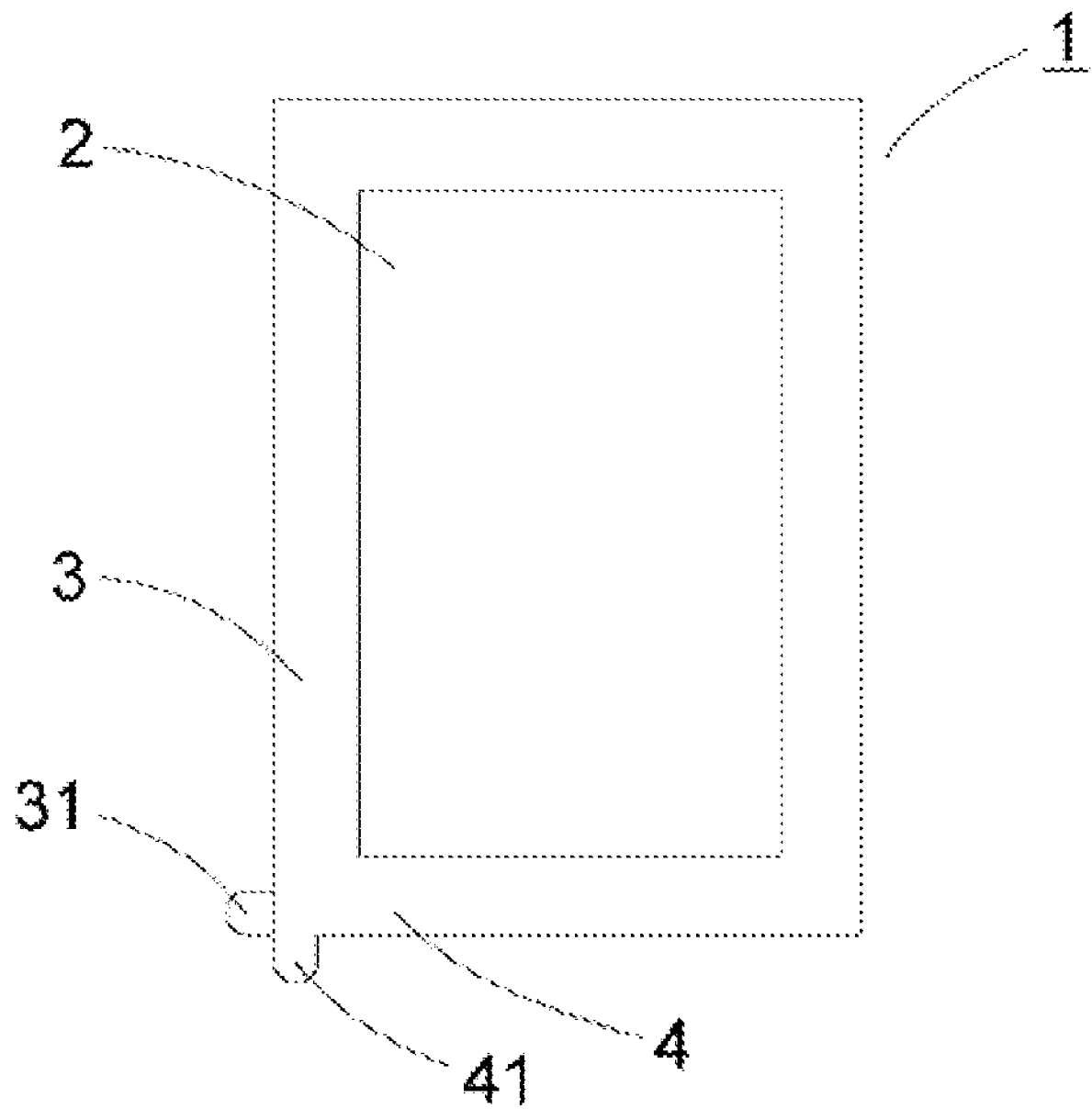
[FIG. 3] A view illustrating a support sheet and a protective sheet each provided with a peeling-starting portion.

FIG. 3 is a view illustrating the support sheet and the protective sheet each provided with a peeling-starting portion.

Peeling-starting portions (31) and (41) are provided for the vicinities of the support sheet (3) and the protective sheet (4) respectively, so as to extend off the glass film laminate (1) by a maximum of about 1 cm. As a result, the support sheet (3) and the protective sheet (4) can be easily peeled from each other by grasping the peeling-starting portion (31) provided for the support sheet (3) and the peeling-starting portion (41) provided for the protective sheet (4) individually and detaching them from each other.

Figure 4A:
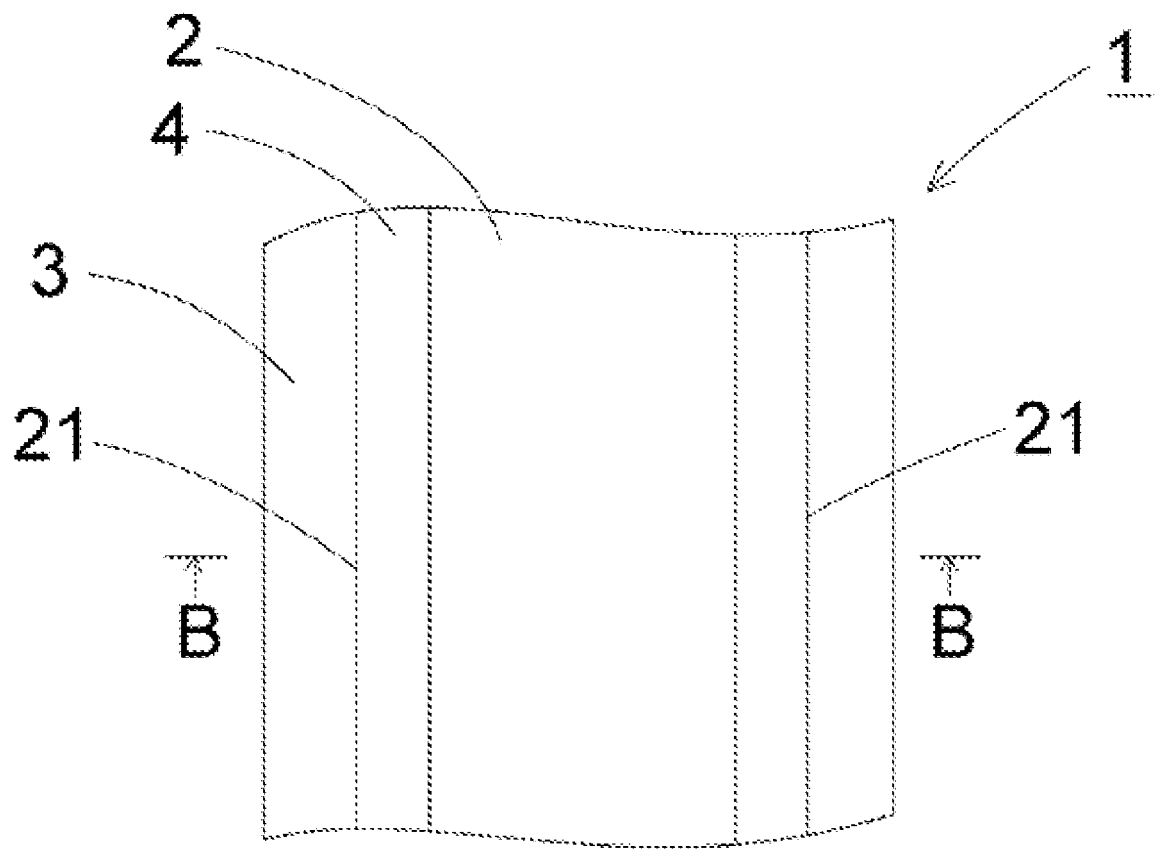
[FIG. 4(a)] A plan view illustrating a glass film laminate according to a second embodiment of the present invention.
Figure 4B:
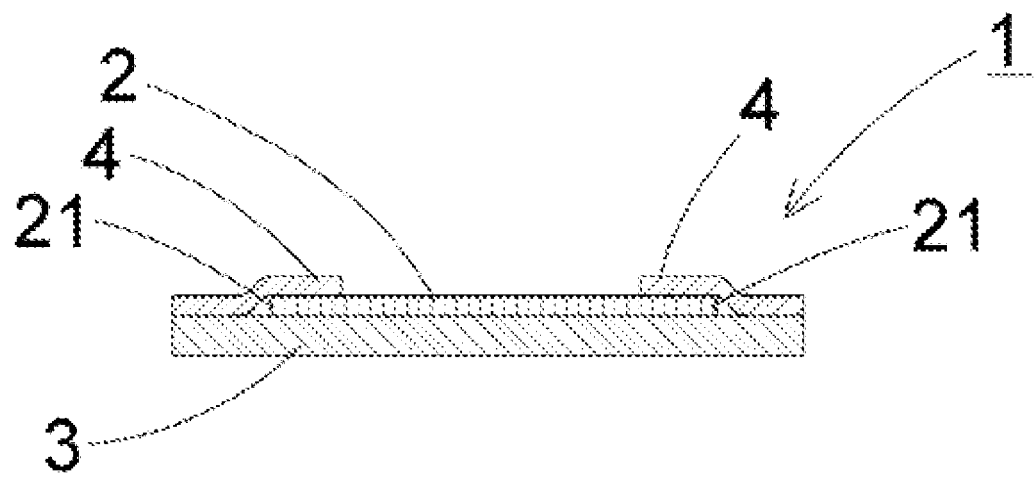
[FIG. 4(b)] A sectional view taken along the line B-B of FIG. 4(a).

FIGS. 4(a) and 4(b) are views illustrating a second embodiment of the glass film laminate according to the present invention. FIG. 4(a) is a plan view and FIG. 4(b) is a sectional view taken along the line B-B of FIG. 4(a).

As illustrated in each of FIGS. 4(a) and 4(b), the glass film laminate (1) according to the second embodiment is such that the protective sheet (4) covers only the cohesive surface of the support sheet (3) and the vicinities of the edges (21) of the glass film and therefore the effective surface of the glass film (2) is not covered with the protective sheet (4). As a result, the effective surface of the glass film (2) can be subjected to production-related treatments such as coating and patterning while the edges (21) of the glass film are protected by the protective sheet (4) so that the occurrence of breaking, chipping, or the like in the glass film (2) may be effectively prevented and the handleability of the glass film (2) may be improved.

Figure 5:
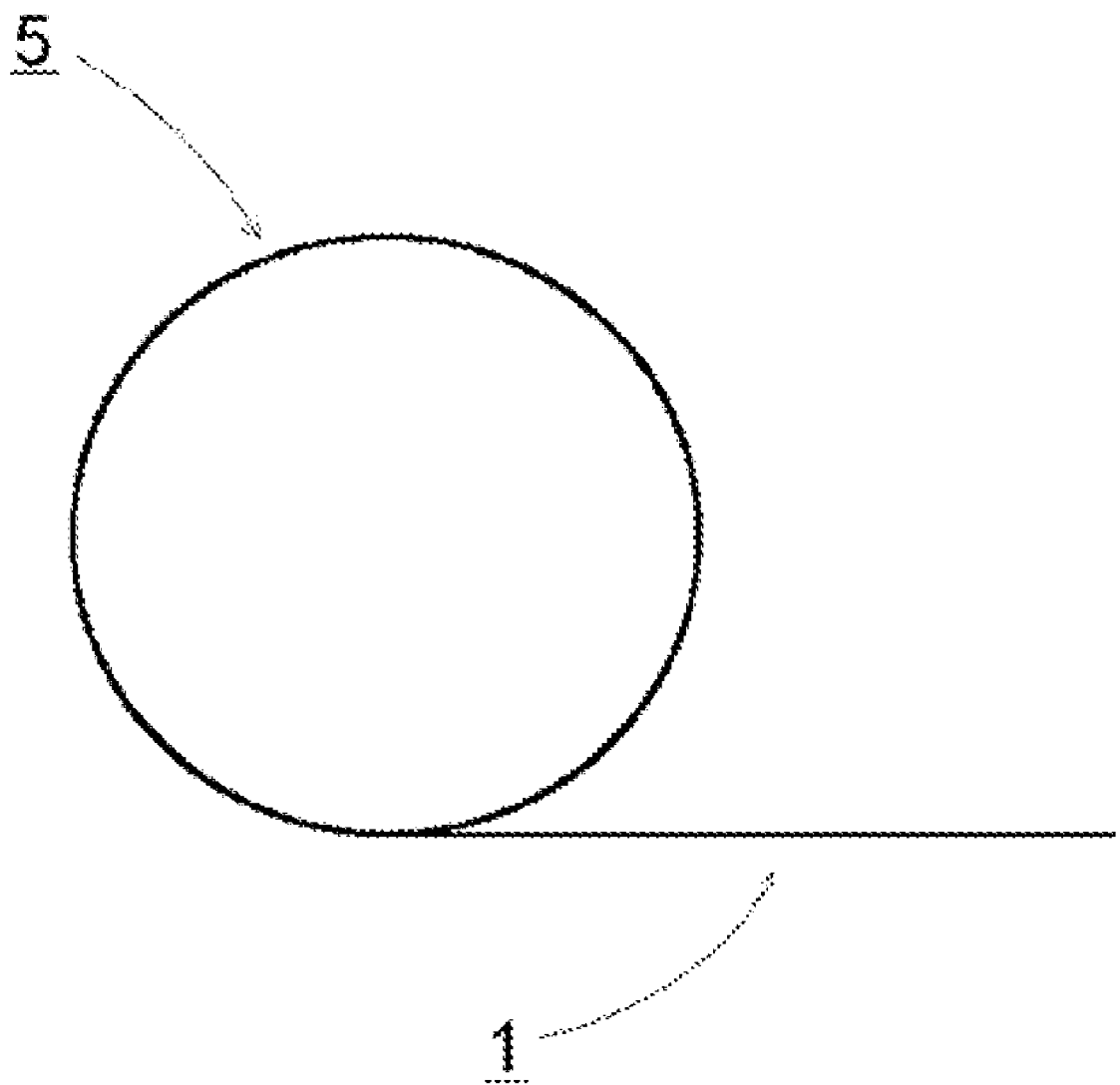
[FIG. 5] A view illustrating a glass roll according to the present invention.

FIG. 5 is a view illustrating a glass roll according to the present invention.

A glass roll (5) according to the present invention is formed by winding the above glass film laminate (1). As a result, the winding can be performed while the occurrence of breaking, chipping, or the like in the glass film (2) is prevented even when the glass roll (5) in which a stress is apt to converge particularly on each of the edges (21) of the glass film is produced.

The cohesive surface of the support sheet (3) is covered with the protective sheet (4). Accordingly, even when the glass roll (5) is produced by winding the glass film laminate (1), the cohesion of overlapped layers of the support sheet (3), which are obtained by the winding, can be prevented, and hence the cause for deflection at the time of the winding can be resolved. As a result, upon winding of the glass film laminate (1), deflection can be absorbed, and hence the winding can be facilitated. In addition, even when a displacement occurs, modification can be easily performed. Therefore, the winding can be performed while the displacement is prevented. Since the handling and winding of the laminate have been facilitated, the laminate can be easily incorporated into a roll-to-roll process upon performance of production-related treatments.

Industrial Applicability

The present invention is preferably used for a glass substrate used in a device such as a flat panel display such as a liquid crystal display or an OLED display and a solar cell, and a cover glass for an OLED lighting.

Reference Signs List 1 glass film laminate
2 glass film
21 edge
3 support sheet
4 protective sheet
5 glass roll

The invention claimed is:

1. A glass roll, which is produced by winding a glass film laminate, the glass film laminate comprising:
   a glass film having a thickness of 300 μm or less and being continuous entirely in the glass film laminate;
   a support sheet laminated on a first surface of the glass film and extending beyond the glass film; and
   a protective sheet peelably laminated on a second surface of the glass film and covering edges of the glass film.

2. The glass roll according to claim 1, wherein the support sheet has a cohesive strength of 0.002 to 2.00 N/25 mm.

3. The glass roll according to claim 1, wherein the support sheet has a thickness of 3 to 250 μm.

4. The glass roll according to claim 1, wherein the protective sheet has a thickness of 3 to 250 μm.

5. The glass roll according to claim 1, wherein the protective sheet covers a cohesive portion of the support sheet.

6. The glass roll according to claim 1, wherein the protective sheet is substantially identical in size to the support sheet.

7. A method of producing a glass roll, the method comprising:
- laminating a cohesive support sheet on a first surface of a glass film so that the cohesive support sheet extends beyond the glass film, the glass film having a thickness of 300 μm or less;
- peelably laminating a protective sheet on a second surface of the glass film so that the protective sheet covers edges of the glass film and a cohesive portion of the cohesive support sheet; and
- winding a glass film laminate including the glass film, the cohesive support sheet, and the protective sheet, wherein the glass film is continuous entirely in the glass film laminate.

8. The method according to claim 7, wherein the winding of the glass film laminate comprises curving the glass film.

9. The glass roll according to claim 1, wherein at least one of the support sheet and the protective sheet is made of a closed cell foamed resin.

10. The glass roll according to claim 1, wherein the protective sheet does not cover an effective surface of the second surface of the glass film.

11. The glass roll according to claim 1, wherein the glass film is curved in the glass roll.

\* \* \* \* \*